United States Patent
Larabi et al.

(10) Patent No.: US 10,313,478 B2
(45) Date of Patent: Jun. 4, 2019

(54) REDIRECTION IN A CONTENT DELIVERY NETWORK

(71) Applicant: Telefonaktiebolaget L M Ericsson (publ), Stockholm (SE)

(72) Inventors: Adel Larabi, Pierrefonds (CA); William Brown, Cumming, GA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 550 days.

(21) Appl. No.: 15/027,357

(22) PCT Filed: May 5, 2014

(86) PCT No.: PCT/IB2014/061216
§ 371 (c)(1),
(2) Date: Apr. 5, 2016

(87) PCT Pub. No.: WO2014/184705
PCT Pub. Date: Nov. 20, 2014

(65) Prior Publication Data
US 2016/0248884 A1      Aug. 25, 2016

Related U.S. Application Data

(60) Provisional application No. 61/824,122, filed on May 16, 2013.

(51) Int. Cl.
H04L 29/08       (2006.01)
H04L 29/06       (2006.01)
H04L 12/707      (2013.01)

(52) U.S. Cl.
CPC ............ H04L 67/327 (2013.01); H04L 45/22 (2013.01); H04L 65/4084 (2013.01);
(Continued)

(58) Field of Classification Search
None
See application file for complete search history.

(56) References Cited

U.S. PATENT DOCUMENTS 9,699,127 B2 *   7/2017   Lennstrom ............. H04L 51/14
2012/0023251 A1  1/2012   Pyle et al.
(Continued)

FOREIGN PATENT DOCUMENTS

WO   2012167106 A1    12/2012
WO   2012168356 A1    12/2012
WO   WO-2012167106 A1 *  12/2012  ........ H04W 36/0011

OTHER PUBLICATIONS

Van Brandenburg, R., et al., "Models for adaptive-streaming-aware CDN Interconnection", Internet-Draft, Jan. 8, 2013, pp. 1-44, IETF.
(Continued)

Primary Examiner — Jeffrey R Swearingen
(74) Attorney, Agent, or Firm — Coats & Bennett, PLLC

(57) ABSTRACT

A method of HTTP redirection is provided for scenarios where a manifest file for media content contains a relative URL. A request router or other network device encapsulates the content manifest file within a root manifest file. The root manifest file contains a base URL that points to the location of the content and a media link that points to the requested content manifest.

16 Claims, 14 Drawing Sheets

(52) U.S. Cl.
CPC .......... *H04L 65/604* (2013.01); *H04L 65/605* (2013.01); *H04L 65/607* (2013.01); *H04L 65/608* (2013.01); *H04L 67/02* (2013.01); *H04L 67/2814* (2013.01); *H04L 65/601* (2013.01)

(56) References Cited

U.S. PATENT DOCUMENTS

| | | | |
|---|---|---|---|
| 2012/0023254 A1* | 1/2012 | Park | H04L 65/4084 709/231 |
| 2014/0143590 A1* | 5/2014 | Bagga | G06F 11/1479 714/4.11 |

OTHER PUBLICATIONS

Adobe Flash Platform, "HTTP Dynamic Streaming on the Adobe® Flash® Platform", Technical White Paper, Sep. 1, 2010, pp. 1-18, retrieved on Apr. 5, 2016, retrieved from internet:https://bugbase.adobe.com/index.cfm?event=file.view&id=2943064&seqNum=6&name=httpdynamicstreaming_wp_ue.pdf.

* cited by examiner

```
<?XML VERSION="1.0" ENCODING="UTF-8"?>
<MANIFEST XMLNS="HTTP://NS.ADOBE.COM/F4M/2.0">
    <BASEURL>HTTP://46.61.185.76:80/SESSION/QRR_N1_20
13-04-16_192642_529426_0859484421/TESTCDN/1TV/1TV-
HDS/HDS-LIVE2/LIVEPKGR/_DEFINST_</BASEURL>
    <MEDIA
HREF="1TV.F4M?TOKEN=82EA6D8A7CEF84ACF334B536E5982A85
_1366226802"/>
</MANIFEST>
```

FIG. 5

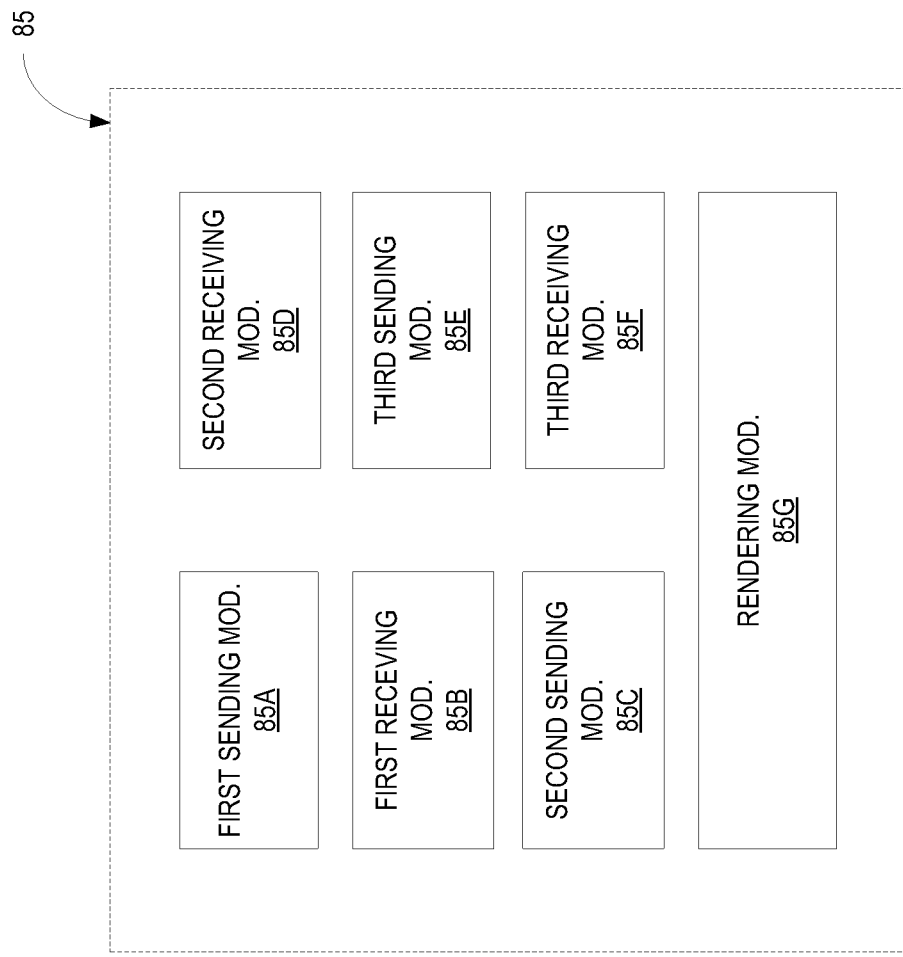

REDIRECTION IN A CONTENT DELIVERY NETWORK

TECHNICAL FIELD

The present disclosure relates generally to media streaming over a content delivery network and, more particularly, to redirection of requests for content having relative uniform resource locators.

BACKGROUND

Streaming media is multimedia that is being constantly delivered from a content provider at the same time it is played or viewed by the end user. The media content is divided into chunks called fragments, which are packaged in media files. Each media file may contain one or more fragments. The media files are "streamed" to the client as the media is played back by the client.

Adaptive bitrate streaming is a technique used in streaming multimedia over communication networks for dynamically adjusting the quality of the media stream depending on available resources, such as available bandwidth and processing capacity. When adaptive bitrate streaming is used, media content may be encoded in different resolutions and/or bitrates. A client's bandwidth and processing capacity is detected in real time and the quality of the media stream is adjusted accordingly by switching between different encoded versions of the same media content.

When adaptive bitrate streamlining is used, a content manifest is provided to describe the different encoded versions of the media content and the location of the media files. The location of files may be specified by a uniform resource locator (URL), which may be an absolute URL or relative URL. An absolute URL provides a full path to the requested file. A relative URL (defined in Internet Engineering Task Force (IETF) standard RFC 1808) specifies a partial path relative to the location of a current file, usually on the same machine. To provide a complete path, the relative URL is combined with a base URL that specifies the protocol and machine. A client requests the manifest file from a server to get location information and metadata about the media files. In the case where live content is streamed using Hypertext Transfer Protocol (HTTP) Dynamic Streaming (HDS), for example, a bootstrap file is then requested. The bootstrap file contains the bootstrap information needed to begin playback of the media. The bootstrap file may also contain one or more media fragments. As the media content is played back, the client requests additional media files.

Most adaptive streaming technologies are based on the Hypertext Transfer Protocol (HTTP) and are designed to work efficiently over large distributed content delivery networks (CDNs). A CDN comprises a system of servers or delivery nodes distributed across the Internet for efficiently delivering media content to content consumers. A CDN operator is typically paid by content providers (CPs) to deliver media content of the content providers to content consumers. The content providers maintain control over the media content while delivery of the media content is handled by the CDN. In the scenario where the content provider uses a CDN to deliver its content to its content consumers, requests for media content are directed to delivery node that can efficiently deliver the content to the content consumer. From the perspective of the content consumer, the request is directed to the content provider's network.

Redirection is the mechanism used by CDNs to re-route requests for content to a particular delivery node within the CDN that is able to deliver the content. The main existing redirection mechanisms in CDNs using the HTTP are Simple HTTP redirection, HTTP redirection with manifest rewrite, and Dynamic Name Server (DNS) Redirection. A problem arises when HTTP redirection methods are used with HDS where the content includes relative uniform resource locators (URLs). With HTTP redirection, a request router in the user's access network receives a request for a content manifest from a media playback device of a content consumer and temporarily redirects the request for the content manifest to a load balancing node in the CDN. The load balancing node, in turn, redirects the HTTP request to a delivery node that will deliver the content based on information carried in HTTP request. The media playback device fetches the content manifest from the delivery node. When temporary redirection is used, the media playback device will direct future requests for media content to the load balancing node rather than the delivery node and each request will be redirected to the delivery node. This approach results in a large number of redirections.

One solution for solving the redirection issue and reducing the number of redirection requests is manifest re-writing. In this case, a content manifest having a relative URL is re-written to provide an absolute URL. The request router receives a request for a content manifest from a media playback device. Rather than re-direct the media playback device, the request router determines the delivery node and fetches the content manifest with a relative URL from the delivery node. The request router then modifies the relative URL in the manifest file to provide an absolute URL and sends the modified content manifest to the media playback device. The media playback device may then fetch the content files (e.g. bootstrap file and content fragments) directly from the serving edge node. However, some content providers object to revision of the content provider's manifest files.

An alternative solution for solving the redirection issue is to use DNS based redirection rather than HTTP redirection. However, there are drawbacks to using DNS based redirection, and some content providers may prefer a solution based on HTTP redirection.

SUMMARY

The present disclosure relates to methods and apparatus for HTTP redirection in scenarios where a content manifest file contains a relative URL. A request router or other network device encapsulates a reference to the content manifest file within a root manifest file. The root manifest file contains a base URL that points to the location of the content and a media link that points to the requested content manifest.

Exemplary embodiments of the disclosure comprise a method of redirection implemented by a request router. According to one method, the request router receives a request message originating from a media playback device of a user requesting a content manifest associated with media content. The request router determines a delivery node (e.g., serving edge node) in the CDN that will deliver the media content to the media playback device and creates a root manifest that encapsulates a base uniform resource locator (URL) pointing to the delivery node and a media link (e.g., HREF) pointing to the requested content manifest. The request router sends a response message including the root manifest to the media playback device.

In some embodiments, determining a delivery node in the content delivery network that will deliver the content to the media playback device comprises forwarding the request message to a load balancing node in the content delivery network, and receiving, responsive to the forwarded request message, a redirection message including a location of the delivery node.

In some embodiments, creating the root manifest comprises creating the base uniform resource location using the location of the delivery node extracted from the redirection message.

In some embodiments, the method further comprises appending a security token to the media link in the root manifest and sending the security token in the response message.

In some embodiments, the request message received by and the response message sent by the request router comprise Hypertext Transfer Protocol messages.

In some embodiments, the response message sent by the request router comprises an HTTP OK message.

Other embodiments of the disclosure comprise a request router. In one embodiment, the request router comprises interface circuits for communicating over a network with other network devices, and a processing circuit connected to said interface circuits, The processing circuit is configured to receive a request message originating from a media playback device of a user requesting a content manifest associated with media content, determine a delivery node in the content delivery network that will deliver the media content to the media playback device, create a root manifest encapsulating a base uniform resource locator pointing to the delivery node and a media link pointing to a content manifest for the requested media content, and send via said interface circuits a response message including the root manifest to the media playback device.

In some embodiments, to determine a delivery node in the content delivery network that will deliver the content to the media playback device, the processing circuit of the request router is configured to forward the request message to a load balancing node in the content delivery network, and receive, responsive to the forwarded request message, a redirection message including a location of the delivery node.

In some embodiments, to create the root manifest, the processing circuit of the request router is configured to create the base uniform resource location using the location of the delivery node extracted from the redirection message.

In some embodiments, the processing circuit of the request router is further configured to append a security token to the media link in the root manifest and sending the security token in the response message.

In some embodiments, the request message received by and the response message sent by the processing circuit in the request router comprise Hypertext Transfer Protocol messages.

In some embodiments, the response message sent by the processing circuit in the request router comprises an HTTP OK message.

Other embodiments of the disclosure comprise computer program products that include program code for execution by a request router. In one embodiment, the program code, when executed by a request router, causes the request router to receive a request message originating from a media playback device of a user requesting a content manifest associated with media content, determine a delivery node in the content delivery network that will deliver the media content to the media playback device, create a root manifest encapsulating a base uniform resource locator pointing to the delivery node and a media link pointing to the requested content manifest, and send via said interface circuits a response message including the root manifest to the media playback device.

Other embodiments of the disclosure comprise a non-transitory computer readable medium storing program code for execution by a request router. In one embodiment, the program code, when executed by a request router, causes the request router to receive a request message originating from a media playback device of a user requesting a content manifest associated with media content, determine a delivery node in the content delivery network that will deliver the content to the media playback device, create a root manifest encapsulating a base uniform resource locator pointing to the delivery node and a media link pointing to the requested content manifest, and send via said interface circuits a response message including the root manifest to the media playback device.

Other embodiments of the disclosure comprise a request router in a content delivery network configured to receive a request message originating from a media playback device of a user requesting a content manifest associated with media content, determine a delivery node in the content delivery network that will deliver the media content to the media playback device, create a root manifest encapsulating a base uniform resource locator pointing to the delivery node and a media link pointing to the requested content manifest, and send via said interface circuits a response message including the root manifest to the media playback device.

Other embodiments of the disclosure comprise methods implemented by a media playback device of streaming media from a content provider. According to one method, the media playback device sends a request message that is received by a request router to request a content manifest associated with media content. The media playback device receives, responsive to the request message, a response message including a root manifest that encapsulates a base uniform resource locator (base URL) pointing to a delivery node in the content delivery network and a media link (e.g., HREF) pointing to the requested content manifest. The media playback device parses the root manifest and sends a second request message for the content manifest to the delivery node using the base URL. The delivery node returns a second response message from the delivery node with a relative content manifest. Thereafter, the media playback device sends one or more requests for the media content to the delivery node. Each request for media content includes the base URL concatenated with a relative URL identifying the media content.

In some embodiments, sending one or more requests for the media content to the delivery node comprises determining a relative uniform resource locator for media content based on the relative content manifest, and creating a third request for the media content by concatenating the relative uniform resource locator for the media content with the base uniform resource locator of the delivery node.

In some embodiments, the media content comprises bootstrap file for a media stream.

In some embodiments, the media content comprises a media fragment of a media stream.

Other embodiments of the disclosure comprise a media playback device for streaming media content. In one embodiment the said media playback device comprises an interface circuit for communicating over a communication network with one or more other networked devices, and a processing circuit (70) operatively connected to the interface circuit. The processing circuit is configured to send a first request message that is received by a request router to request a content manifest associated with media content and to receive, responsive to the request message, a response message including a root manifest that encapsulates a base uniform resource locator pointing to a delivery node in the content delivery network and a media link pointing to the requested content manifest. The processing circuit is further configured to send a second request message for the content manifest to the delivery node using the base uniform resource locator, receive a second response message with a relative content manifest from the delivery node, and send one or more requests for the media content to the delivery node.

In some embodiments, to send one or more requests for the media content to the delivery node, the processing circuit is configured to determine a relative uniform resource locator for media content based on the relative content manifest, and create a third request for the media content by concatenating the relative uniform resource locator for the media content with the base uniform resource locator of the delivery node.

In some embodiments, the media content requested by the processing circuit comprises bootstrap file for a media stream.

In some embodiments, the media content requested by the processing circuit comprises a media fragment of a media stream.

Other embodiments of the disclosure comprise a computer program product comprising program code that when executed by a media playback device, causes the media playback device to send a first request message that is received by a request router to request a content manifest associated with media content; receive, responsive to the request message, a response message including a root manifest that encapsulates a base uniform resource locator pointing to a delivery node in the content delivery network and a media link pointing to the requested content manifest; send a second request message for the content manifest to the delivery node using the base uniform resource locator; receive a second response message with a relative content manifest from the delivery node; and send one or more requests for the media content to the delivery node.

Other embodiments of the disclosure comprise a non-transitory computer readable medium storing program code that when executed by a processing circuit in a media playback device, causes the media playback device to send a first request message related to requested media content that is received by a request router to request a content manifest associated with media content; receive, responsive to the request message, a response message including a root manifest that encapsulates a base uniform resource locator pointing to a delivery node in the content delivery network and a media link pointing to the requested content manifest; send a second request message for the content manifest to the delivery node using the base uniform resource locator; receive a second response message with a relative content manifest from the delivery node; and send one or more requests for the media content to the delivery node.

Other embodiments of the disclosure comprise a media playback device for streaming media content. The media playback device is configured to send a first request message that is received by a request router (15) to request a content manifest associated with media content; receive, responsive to the request message, a response message including a root manifest that encapsulates a base uniform resource locator pointing to a delivery node in the content delivery network and a media link pointing to the requested content manifest; send a second request message for the content manifest to the delivery node using the base uniform resource locator; receive a second response message with a relative content manifest from the delivery node; and send one or more requests for the media content to the delivery node.

The redirection techniques disclosed herein result in significant overhead reduction by eliminating the need for HTTP redirection for each fragment of the media content.

BRIEF DESCRIPTION OF THE DRAWINGS

FIG. 5 illustrates an exemplary root manifest.

FIG. 13 illustrates a computer-readable medium containing program code for execution by a media playback device or other end user device.

DETAILED DESCRIPTION

Embodiments of the present disclosure relates generally to media streaming over a content delivery network When adaptive bitrate streaming is used, media content may be encoded in different resolutions and/or bitrates. A content manifest describes the different encoded versions of the media content and the location of the media files. Once a version of the media content is selected for playback, a media playback device may request a bootstrap file that provides the initial information needed to begin playback of the media. The media content is typically delivered in chunks called fragments. To begin playback, the media playback device requests a media file containing one or more fragments. As the media content is played back, the media playback device will request additional media files.

Figure 1:
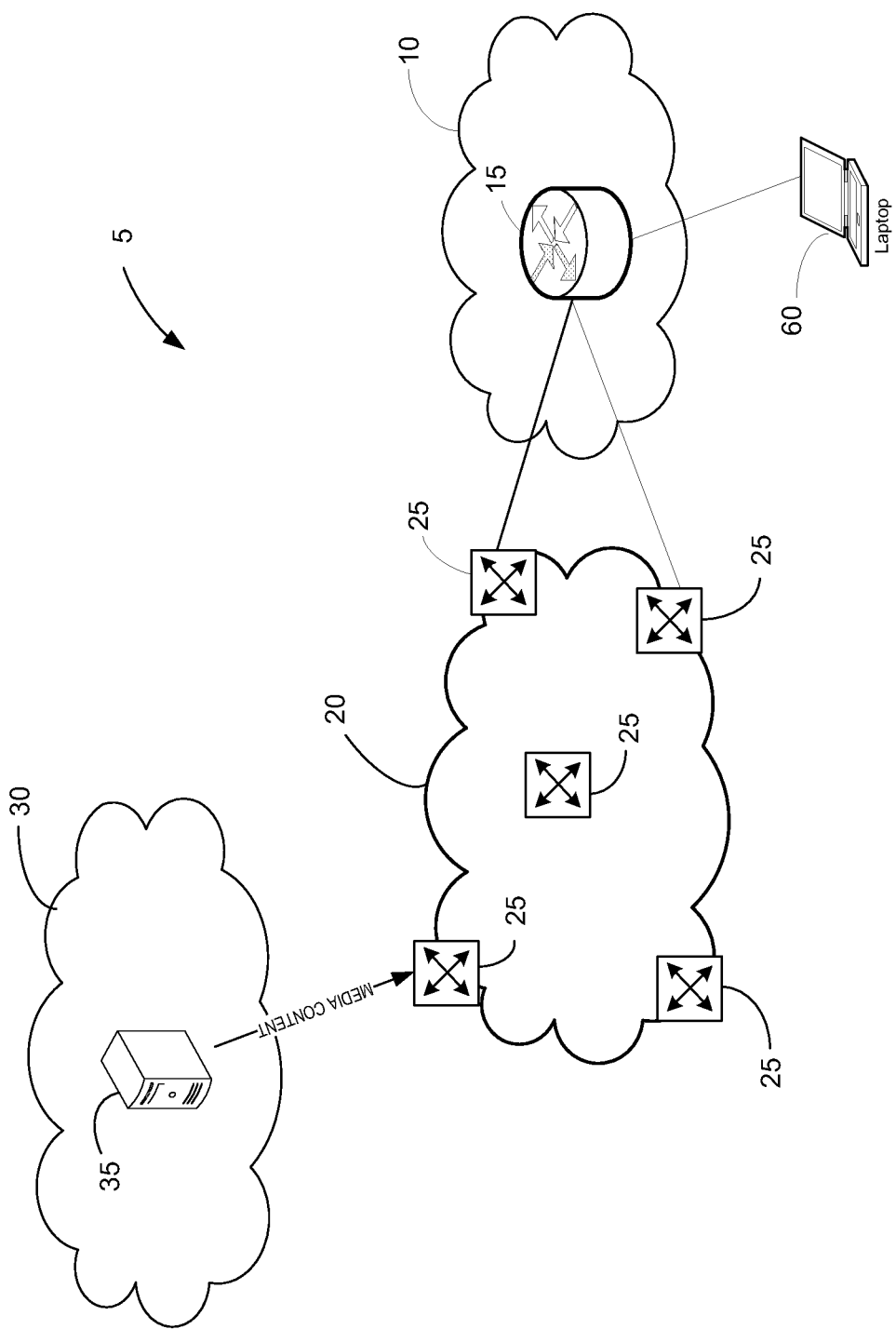
FIG. 1 illustrates a communication network for delivering media content from a content provider to a content consumer.

FIG. 1 illustrates an exemplary communication network 5 for delivering (e.g., streaming) media content from a content provider to a content consumer. In one exemplary embodiment, the communication network 5 uses the Hypertext Transfer Protocol (HTTP) and an adaptive bitrate (ABR) streaming protocol to stream media content from the content provider to the content consumer. An exemplary ABR streaming protocol is the HTTP Dynamic Streaming (HDS) protocol. Those skilled in the art will appreciate that the present disclosure is not limited to HDS, but is also applicable to other transport protocols and ABR streaming protocols. Examples of other transport protocols include Real-time Transport Protocol (RTP), Real-Time Streaming Protocol (RTSP), and Real-time Messaging Protocol (RTMP). Other ABR streaming protocols include Dynamic Adaptive Streaming over HTTP, HTTP Live Streaming Protocol, Adobe Dynamic Streaming for Flash, and Microsoft Smooth Streaming.

The communication network 5 comprises an access network 10 for providing network access to content consumers, a content delivery network (CDN) 20 for delivering the content, a content provider network (CPN) 30 for providing the media content. The access network 10 includes one or more request routers 15 for routing messages (e.g., HTTP requests) between media playback devices 60 of content consumers and edge nodes 25 in the CDN 20. The CDN 20 includes one or more edge nodes 25, which may be grouped into clusters. One edge node 25 in each cluster, referred to herein as the load balancing node 25L, is responsible for distributing the loads among the edge nodes 25 in the cluster. Other edge nodes 25, referred to herein as the delivery nodes 25D, are responsible for delivering content to the content consumers. The CPN 30 includes a content server 35 for serving the media content. The CPN 30 may further include one or more additional nodes for caching media content. The terms node, router, server and similar terms as used herein refer to network devices having processing circuits and interface circuits that are capable of exchanging communications with other network devices.

Figure 2A:
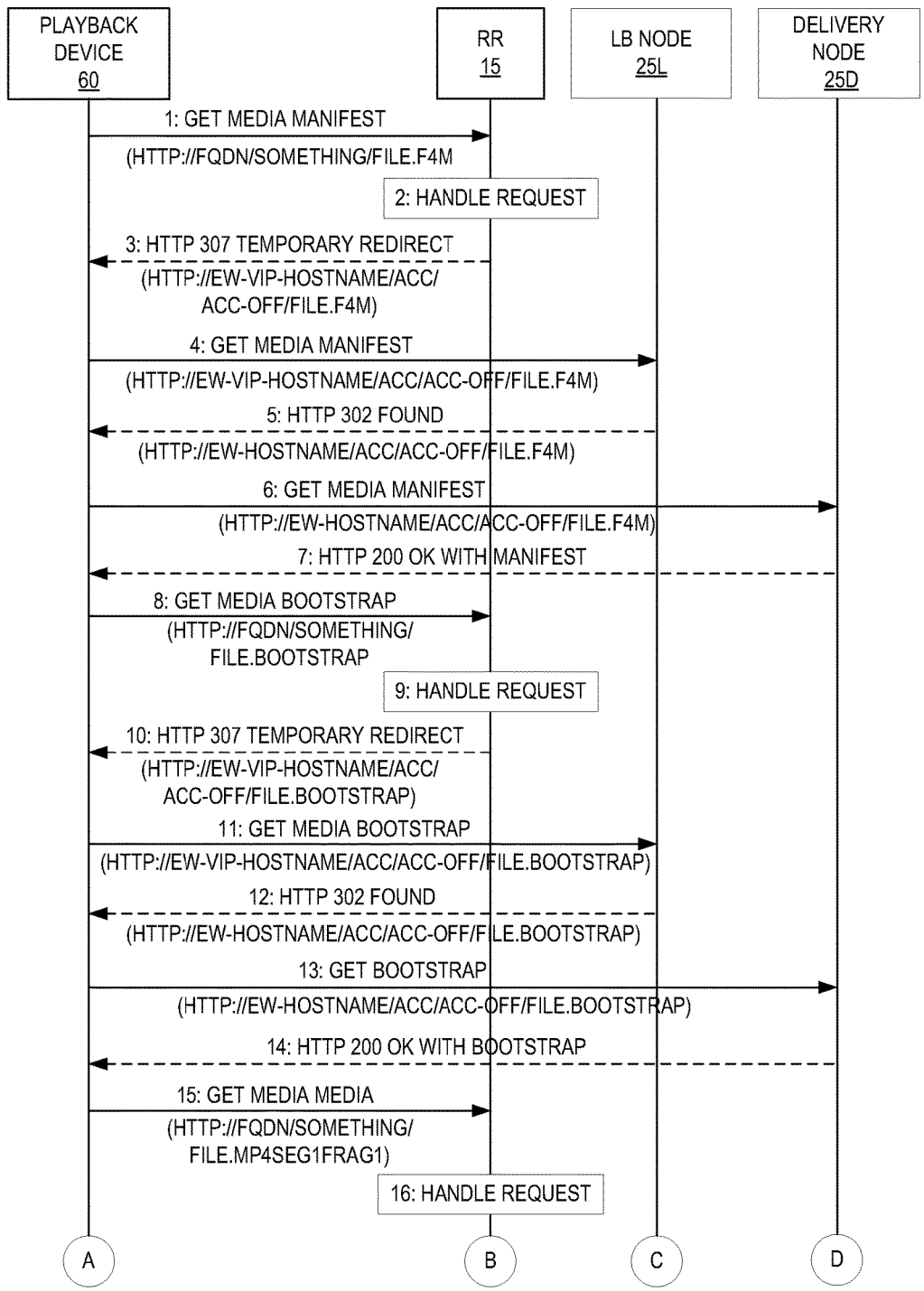
FIGS. 2A and 2B illustrate a method of HTTP redirection.
Figure 2B:
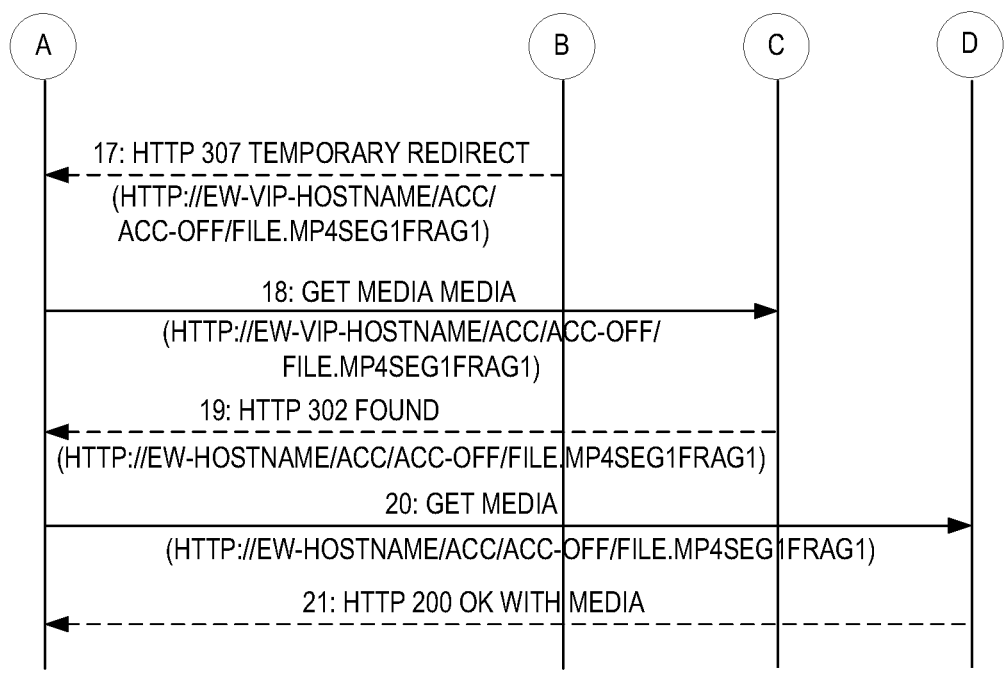

FIG. 2 illustrates an exemplary method of HTTP redirection in a CDN. A request router (RR) 15 in the access network 10 receives a request for a content manifest from a media playback device 60 of a user (USER) and temporarily redirects the request for the content manifest to a load balancing node (LBN) 25L in the CDN 20 (steps 1-3). The load balancing node 25L, in turn, redirects the HTTP request to a delivery node (DN) 25 that will deliver the content based on information carried in HTTP request (steps 4-5). The media playback device 60 fetches the content manifest from the delivery node (steps 6-7). Because a temporary redirection was used, the media playback device 60 will direct future requests for media content to the load balancing node 25L rather than the delivery node 25D and each request will be redirected to the delivery node 25D (steps 8-21). This approach results in a large number of redirections.

Figure 3:
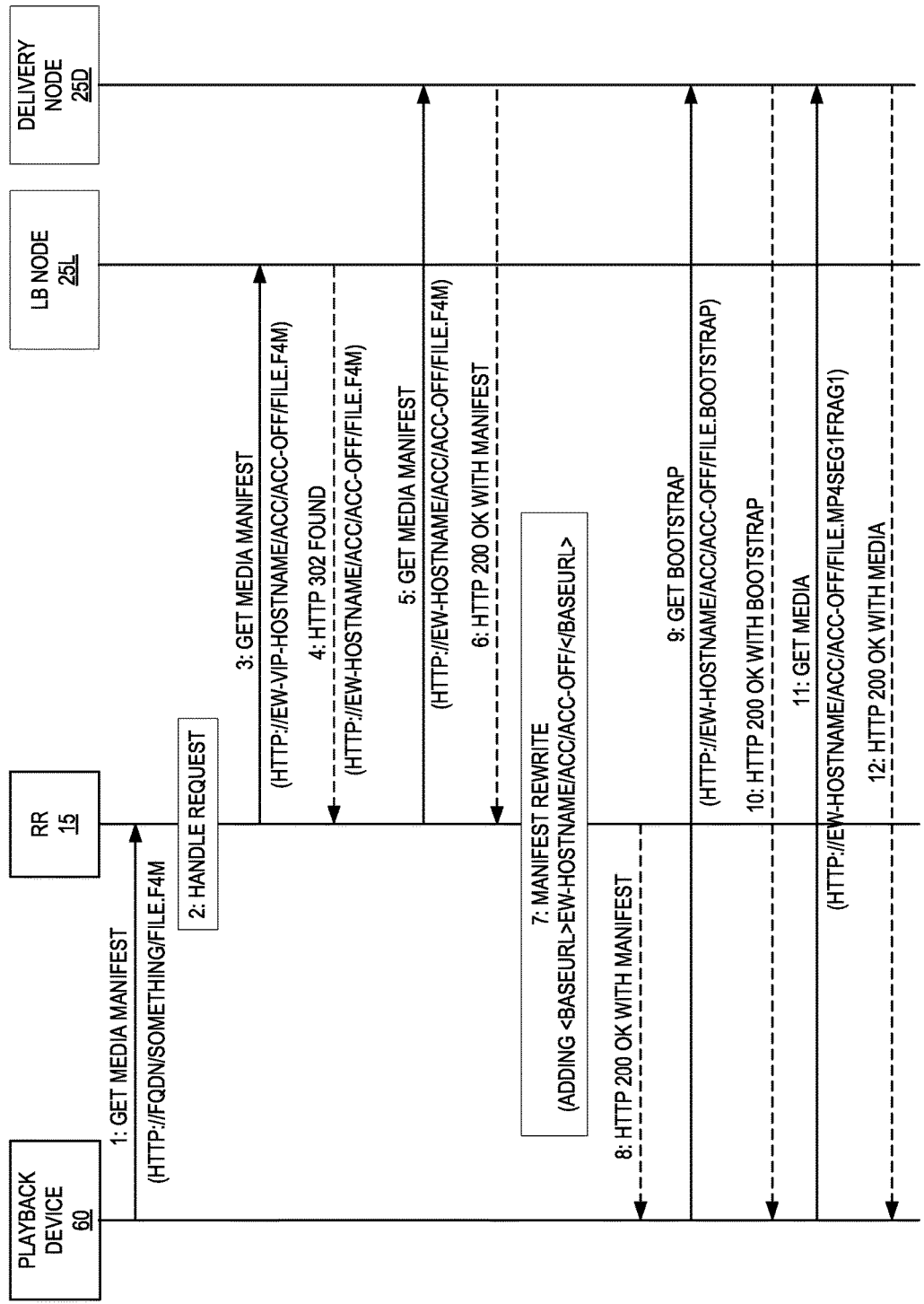
FIG. 3 illustrates a method of HTTP redirection with manifest re-write.

FIG. 3 illustrates another method of HTTP redirection with manifest re-writing. The request router (RR) 15 receives a request for a content manifest from a media playback device 60 (USER) (step 1). Rather than re-direct the media playback device 60, the request router 15 determines the delivery node 25D (steps 3-4) and fetches the content manifest with a relative URL from the delivery node 25D (steps 5-6). In the exemplary embodiment, the delivery node 25D is determined by forwarding the request message to a load balancing node 25L (step 3). The load balancing node 25L responds with a redirection message (e.g. HTTP 302 FOUND) including the location of the delivery node 25D (step 4). The request router 15 uses the information obtained through CDN request routing to modify the relative URL in the manifest file to provide an absolute URL (step 7) and sends the modified content manifest to the media playback device 60 (step 8). The media playback device 60 may then fetch the content files (e.g. bootstrap file and content fragments) directly from the delivery node 25D (steps 9-12). However, some content providers object to revision of the content provider's manifest files.

Figure 4:
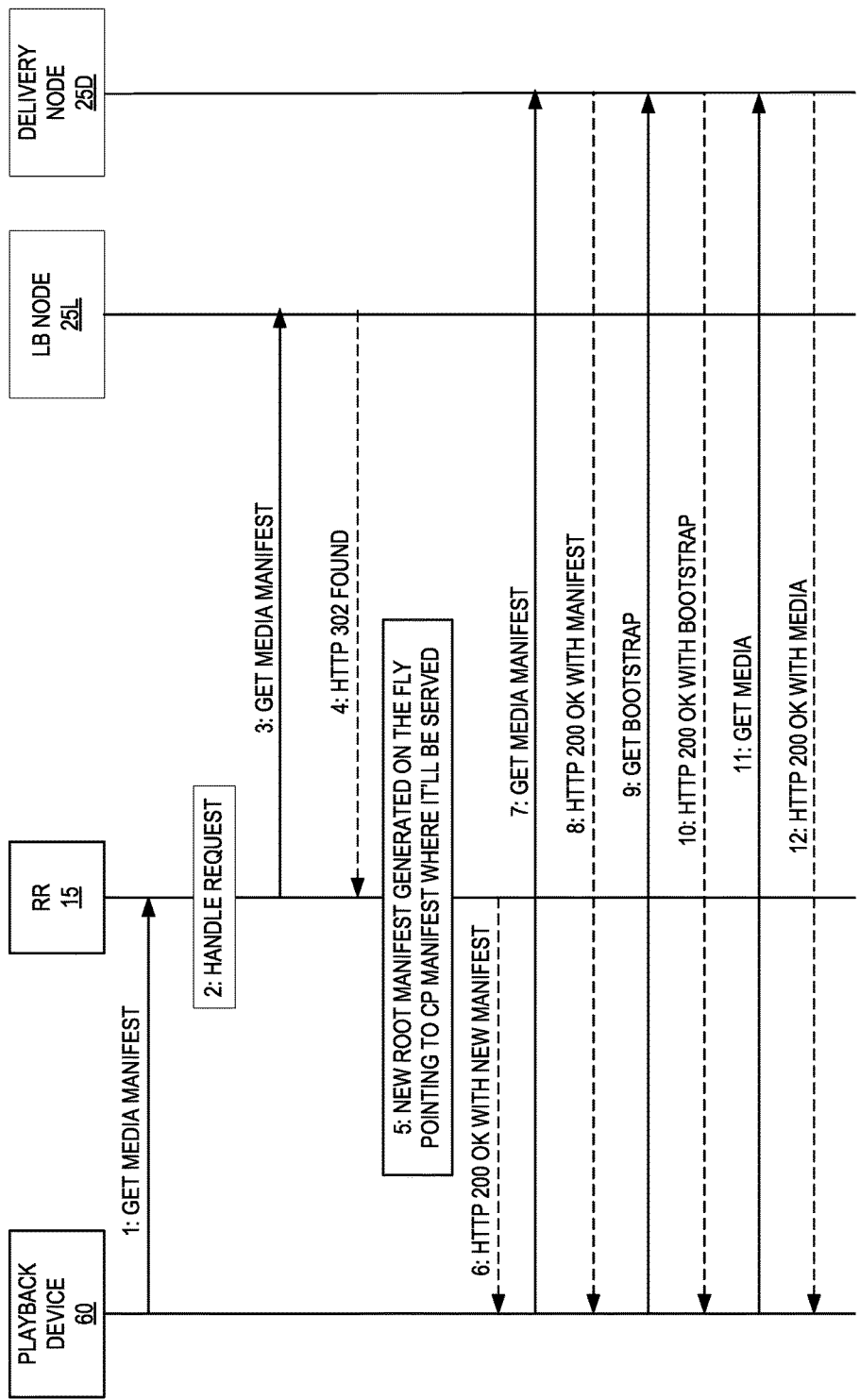
FIG. 4 illustrates a method of HTTP redirection with manifest encapsulation.

FIG. 4 illustrates an exemplary method of redirection according to one embodiment of the disclosure. A request router (RR) 15 receives a request for a content manifest originating from a media playback device 60 of a user (step 1). Responsive to the request, the request router 15 selects a delivery node 25D in the CDN 20 and creates a root manifest (steps 2-5). In the exemplary embodiment, the serving edge node 25 is determined by forwarding the request message to a load balancing node 25L (step 3). The load balancing node 25L responds with a redirection message (e.g., HTTP 302 FOUND) including the location of the delivery node 25D (step 4).

After receiving the redirection message, the request router 15 creates the root manifest using the location provided by the load balancing node 25L in the redirection message (step 5). The root manifest encapsulates a base uniform resource locator (base URL) pointing to the delivery node 25D that will deliver the media content and a media link (e.g., "HREF") pointing to content manifest. In some embodiment, other information (e.g., a security token) may be concatenated with the media link if needed.

The request router 15 returns a response message (e.g., HTTP 200 OK) with the root manifest to the media playback device 60 responsive to the request message (step 6). The media playback device 60 parses the root manifest and requests the content manifest directly from the delivery node 25D using the base URL (step 7). The delivery node 25D returns a response message (e.g., HTTP 200 OK) with the requested content manifest to the media playback device 60. Because the content manifest is relative (content without base URL tag) the media playback device 60 will request the bootstrap file using the same base URL for the content manifest concatenated with a bootstrap relative URL (step 9). Thus, the request for the bootstrap file will end up on the same serving edge node 25. The delivery node 25D returns the bootstrap file (step 10). The media playback device 60 may request additional media fragments from the same delivery node 25D (step 11) and the delivery node 25D will deliver the requested media fragments responsive to the requests (step 12).

An exemplary root manifest is shown in FIG. 5. The root manifest in FIG. 5 includes a base URL and media link pointing to the delivery node 25D that will deliver the media content and a media link (e.g., "HREF") pointing to the content manifest. In this example, a token is appended to the media link. The token is used in connection with security protocols and is not material to the disclosure.

The techniques described herein avoid the issue of the media playback device 60 not handling redirection and adding HTTP overhead. Using internal manifest processing results in significant overhead reduction by eliminating the need for HTTP redirection for each fragment of the media content. For a 90-minute movie having 10 second fragments, a minimum of 540 HTTP request redirections will be saved on the total traffic. The redirection techniques can be offered to content providers as one of several alternative types of HTTP redirection methods that the CDN 20 is capable of providing, and is not necessarily limited to HDS content. The techniques may be applied to other adaptive bitrate streaming protocols.

Figure 6:
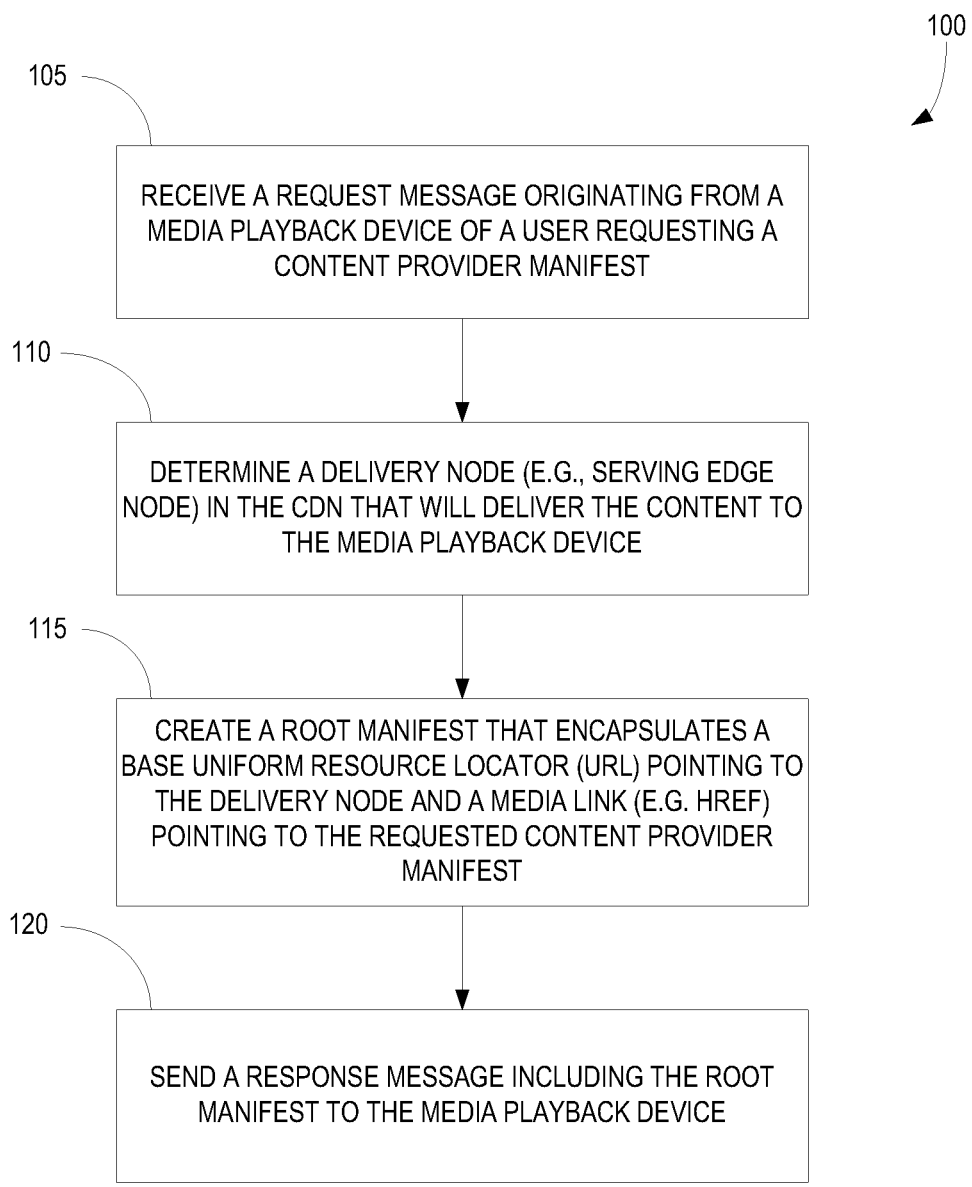
FIG. 6 illustrates an exemplary method of redirection performed by a request router.

FIG. 6 illustrates a method 100 of redirection performed by a request router 15 in an access network 10. The request router 15 receives a request message originating from a media playback device 60 of a user requesting a content manifest (block 105). The request message relates to requested media content. The request router 15 determines a delivery node 25D in a CDN 20 that will deliver the media content to the media playback device 60 (block 110) and creates a root manifest that encapsulates a base uniform resource locator (URL) pointing to the delivery node 20 and a media link (e.g., "HREF") pointing to the requested content manifest (block 115). The request router 15 sends a response message including the root manifest to the media playback device 60 (block 120).

Figure 7:
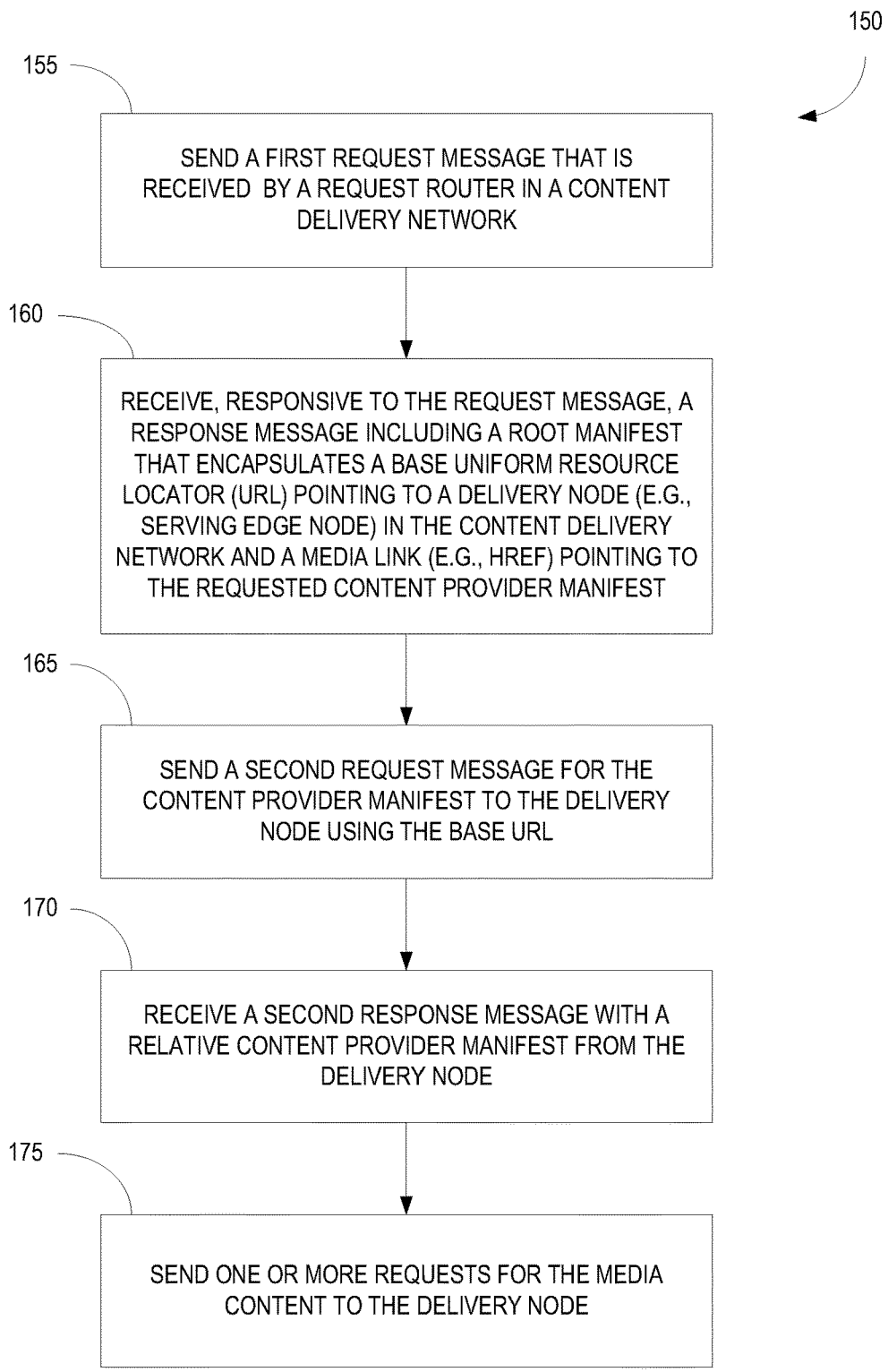
FIG. 7 illustrates an exemplary method of redirection performed by a media playback device.

FIG. 7 illustrates a method 150 implemented by a media playback device 60 of requesting media content from a content provider. The media playback device 60 sends a first request message related to requested media content to a request router 15 in an access network 10 (block 155). The request message includes a reference to a content manifest for the requested media content. The media playback device 60 receives, responsive to the first request message, a first response message including a root manifest from the request router 15 (block 160). The root manifest encapsulates a base URL pointing to a delivery node 25D in a CDN 20 and a media link (e.g., "HREF") pointing to the requested content manifest. The media playback device 60 sends a second request message for the content manifest to the delivery node 25D using the base URL in the root manifest (block 165). The media delivery device 60 receives a second response message with a relative content manifest from the delivery node 25D (block 170). The media playback device 60 sends one or more requests for media content to the delivery node 25D (block 175). Each request for media content includes the base URL concatenated with a relative URL identifying the media content.

Figure 8:
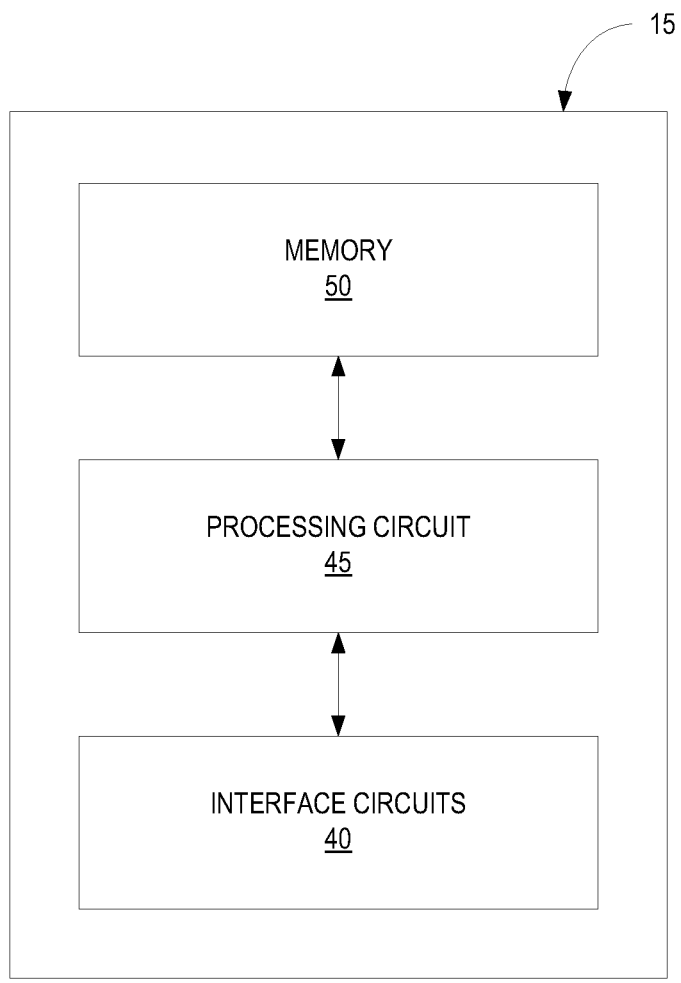
FIG. 8 illustrates an exemplary request router configured to perform HTTP redirection with manifest encapsulation.

FIG. 8 illustrates an exemplary request router 15 or other network device according to an embodiment of the disclosure. The request router 15 includes interface circuits 40 for communicating with the media playback device 60 and edge nodes 25 in a CDN 20. The processing circuit 45 comprises one or more microprocessors, hardware, firmware or a combination thereof. The processing circuit 45 is configured to perform the method of redirection as shown in FIG. 6. Memory 50 stores program instructions and data used by the processing circuit 45 for operation. Memory 50 may comprise volatile memory such as random access memory (RAM) for storing temporary data and/or non-volatile memory such read only memory (ROM) of Flash memory for storing program instructions a data needed for operation.

Figure 9:
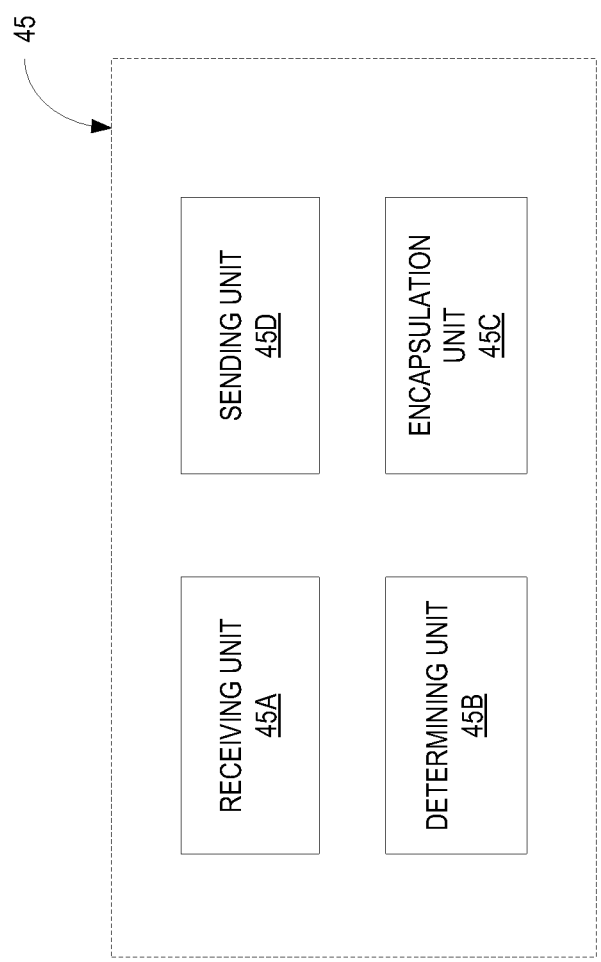
FIG. 9 illustrates the main functional components of a processing circuit for a request router or other device for routing request for media content.

FIG. 9 illustrates the main functional components of the processing circuit 45 in the request router or other network device for routing requests for media content. The processing circuit 45 comprises a receiving unit 45A, determining unit 45B, an encapsulation unit 45C and sending unit 45D. The units 45A-45D may be implemented by program code executed by the processing circuit 45. The receiving unit 45A is configured to receive a request message via the interface circuits 40 that originates from a media playback 60 of a user requesting a content manifest associated with media content. The determining unit 45B is configured to determine a deliver node 25D and the content delivery network that will deliver the content to the media playback device 60. The encapsulation unit 45C is configured to create a root manifest encapsulating a base uniform resource locater pointing to the delivery node 25D and a media link pointing to the requested content manifest. The sending unit 45D is configured to send via the interface circuits 40 a response message to the media playback device 60 including the root manifest.

Figure 10:
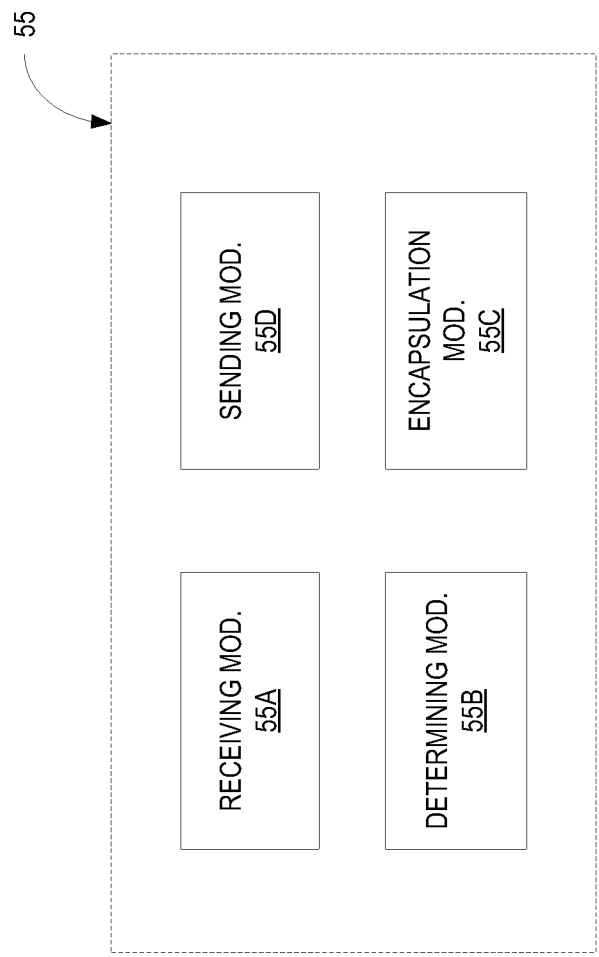
FIG. 10 illustrates a computer-readable medium containing program code for execution by a request router or other device for routing request for media content.

FIG. 10 illustrates a non-transitory computer readable medium 55 storing computer program code for execution by a request router 15. The computer program code comprises a receiving module 55A, a determining module 55B, an encapsulation module 55C, and a sending module 55D. Modules 55A-55D are referred to collectively herein as a computer program product. The receiving module 55A, when executed by the processing circuit 45 in the request router 15, causes the request router 15 to receive a request message via the interface circuits 40 originating from a media playback device 60 of a user requesting a content manifest associated with media content. The determining module 55B, when executed by the processing circuit 45, causes the request router 15 to determine a delivery node 25D in the content delivery network that will deliver the content to the media playback device 60. The encapsulation module 55C, when executed by the processing circuit 45, causes the request router 15 to create a root manifest encapsulating a base uniform resource locater pointing to the delivery node 25D and a media link pointing to the requested content manifest. The sending module 55D, when executed by the processing circuit 45 causes the request router 15 to send via the interface circuits 40 a response message including the root manifest to the media playback device 60.

Figure 11:
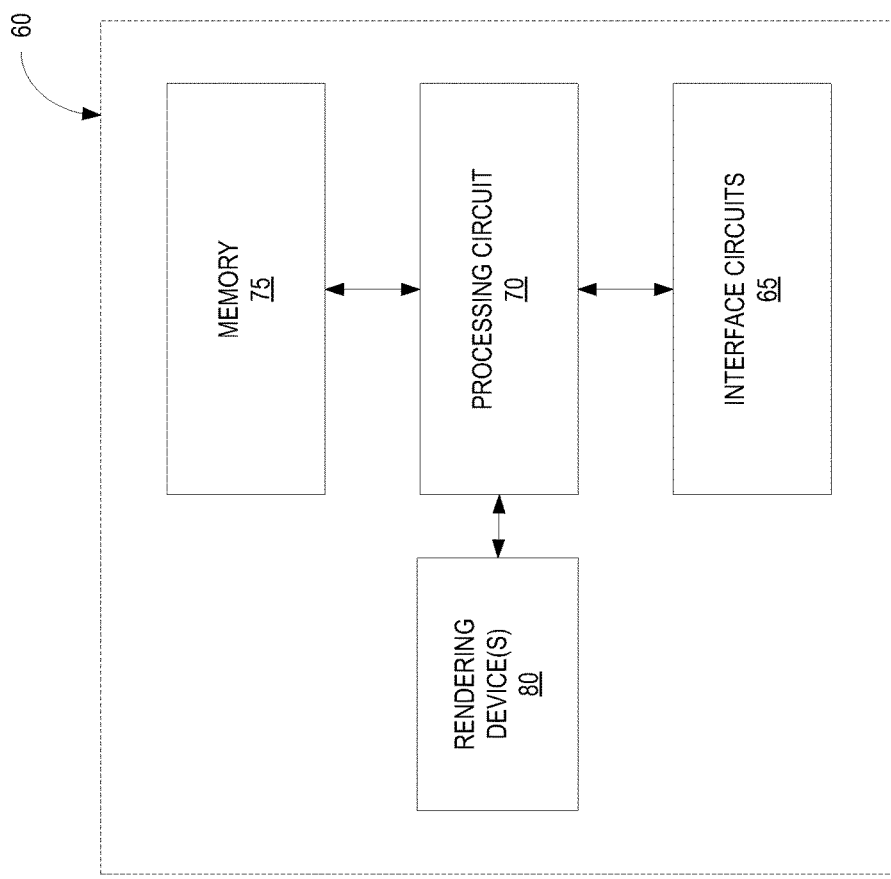
FIG. 11 illustrates an exemplary media playback device.

FIG. 11 illustrates an exemplary media playback device 60 or other end user device according to an embodiment of the disclosure. The media playback device 60 comprises interface circuits 65 for communicating over an access network 10 with the request router 15. The media playback device 60 further includes a processing circuit 70, memory 75, and a media rendering device 80. The processing circuit 70 comprises one or more microprocessors, hardware, firmware or a combination thereof. The processing circuit 70 is configured to perform the methods illustrated in FIG. 7 to request media content. Memory 75 stores program instructions and data used by the processing circuit 70 for operation. Memory 75 may comprise volatile memory such as random access memory (RAM) for storing temporary data and/or non-volatile memory such read only memory (ROM) of Flash memory for storing program instructions a data needed for operation.

The media rendering devices 80 comprise any suitable rendering devices for rendering audio and/or video. In one exemplary embodiment, the media rendering device 80 comprises a display device, one or more speakers, and associated processing circuits for processing video and/or audio signals.

Figure 12:
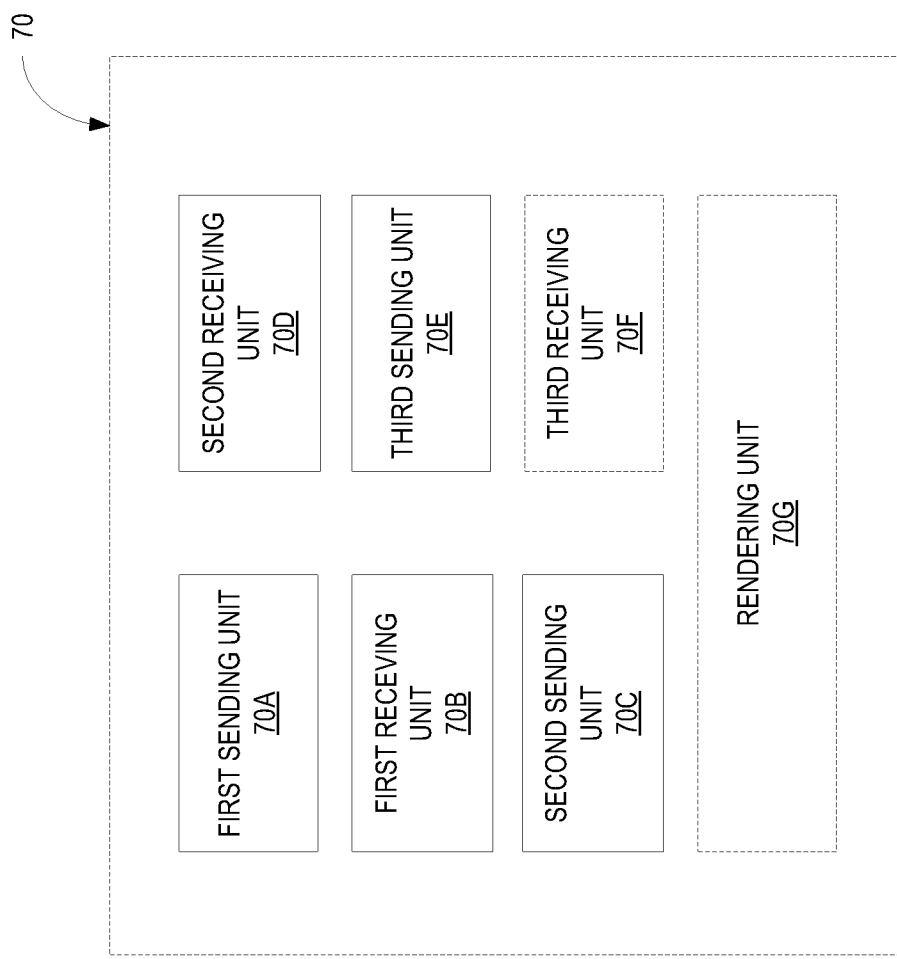
FIG. 12 illustrates the main functional components of a processing circuit for a media playback device or other end user device.

FIG. 12 illustrates the main functional components of the processing circuit 70 in the media playback device or other end user device according to embodiments of the present disclosure. The processing circuit 70 comprises a first sending unit 70A, a first receiving unit 70B, a second sending unit 70C, a second receiving unit 70D, and a third sending unit 70E. The processing circuit 70 may also optionally include a third receiving unit 70F, and a rendering unit 70G. The units 70A-70G may be implemented by program code executed by the processing circuit 70. The first sending unit 70A is configured to send a first request message that is received by a request router to request a content manifest associated with media content. The first receiving unit 70B is configured to receive, responsive to the request message, a response message including a root manifest that encapsulates a base uniform resource locater pointing to a delivery node in the content delivery network and media link pointing to the requested content manifest. The second sending unit 75C is configured to send a second request message for the content manifest to the delivery node using the base uniform resource locater extracted from the root manifest. The second receiving unit 75D is configured to receive a second response message with a relative content manifest from the delivery node 25D. The third sending unit 70E is configured to send one or more requests for media content to the delivery node 25D.

FIG. 13 illustrates a non-transitory computer readable medium 85 storing program code for execution by a media playback device 60 or other end user device according to an embodiment of the disclosure. The program code includes a first sending module 85A, a first receiving module 85B, a second sending module 85C, a second receiving module 85D, and a third receiving module 85E. The program code may also optionally include a third receiving module 85F, and a rendering module 85G. Modules 85A-85G are referred to collectively herein as a computer program product. The first sending module 85A, when executed by the processing circuit 70 of the media playback device 60, causes the media playback device 60 to send a first request message that is received by a request router to request a content manifest associated with media content. The first receiving module 85B, when executed by the processing circuit 70, causes the media playback device 60 to receive, responsive to the request message, a response message including a root manifest that encapsulates a base uniform resource locater pointing to a delivery node 25D in the content delivery network 20 and a media link pointing to the requested content manifest. The second sending module 85C, when executed by the processing circuit 70, causes the media playback device 60 to send a second request message for the content manifest to the delivery node 25D using the base uniform resource locater. The second receiving module 85D, when executed by the processing circuit 70, causes the media playback device 60 to receive a second response message with a relative content manifest from the delivery node 25D. The third sending module 85E, when executed the processing circuit 70, causes the media playback device 60 to send one or more requests for the media content to the delivery node 25D. The third receiving module 85E, when executed by the processing circuit 70, causes the media playback device 60 to send additional request messages for media content to the delivery node 25D. The rendering module 85G, when executed the processing circuit 70, causes the media playback device 60 to render the media content.

The redirection techniques disclosed herein result in significant overhead reduction by eliminating the need for HTTP redirection for each fragment of the media content.

What is claimed is:

1. A method implemented by a request router of routing requests related to media content, said method comprising:
   receiving a request message originating from a media playback device of a user requesting a content manifest associated with media content;
   determining a delivery node in the content delivery network that will deliver the media content to the media playback device, wherein determining the delivery node comprises:
      forwarding the request message to a load balancing node in the content delivery network;
      receiving, responsive to the forwarded request message, a redirection message including a location of the delivery node;
   creating a root manifest encapsulating a base uniform resource locator pointing to the delivery node and a media link pointing to the requested content manifest, wherein the base uniform resource locator is created using the location of the delivery node extracted from the redirection message; and
   sending a response message including the root manifest to the media playback device.

2. The method of claim 1 further comprising appending a security token to the media link in the root manifest and sending the security token in the response message.

3. The method of claim 1 wherein the request message and the response message comprise Hypertext Transfer Protocol messages.

4. The method of claim 3 wherein the response message comprises an HTTP OK message.

5. A request router for routing requests related to media content, said request router comprising:
   interface circuits for communicating over a network with other networked devices;
   a processing circuit connected to said interface circuits, said processing circuit configured to:
      receive a request message via said interface circuits originating from a media playback device of a user requesting a content manifest associated with media content;
      determine a delivery node in the content delivery network that will deliver media content to the media playback device by:
         forwarding the request message to a load balancing node in the content delivery network;
         receiving, responsive to the forwarded request message, a redirection message including a location of the delivery node;
      create a root manifest encapsulating a base uniform resource locator pointing to the delivery node and a media link pointing to the requested content manifest, wherein the base uniform resource locator is created using the location of the delivery node extracted from the redirection message; and
      send via said interface circuits a response message including the root manifest to the media playback device.

6. The request router of claim 5 wherein the processing circuit is further configured to append a security token to the media link in the root manifest and sending the security token in the response message.

7. The request router of claim 5 wherein the request message and the response message comprise Hypertext Transfer Protocol messages.

8. The request router of claim 5 wherein the response message comprises an HTTP OK message.

9. A method of streaming media content, said method comprising:
   sending a first request message that is received by a request router to request a content manifest associated with media content;
   receiving, responsive to the request message, a response message including a root manifest that encapsulates a base uniform resource locator pointing to a delivery node in the content delivery network and a media link pointing to the requested content manifest;
   sending a second request message for the content manifest to the delivery node using the base uniform resource locator;
   receiving a second response message with a relative content manifest from the delivery node; and
   sending one or more requests for the media content to the delivery node.

10. The method of claim 9 wherein sending one or more requests for the media content to the delivery node comprises:
   determining a relative uniform resource locator for media content based on the relative content manifest; and
   creating a third request for the media content by concatenating the relative uniform resource locator for the media content with the base uniform resource locator of the delivery node.

11. The method of claim 10 wherein the media content comprises bootstrap file for a media stream.

12. The method of claim 10 wherein the media content comprises a media fragment of a media stream.

13. A media playback device for streaming media content, said media playback device comprising:
- an interface circuit for communicating over a communication network with one or more other networked devices;
- a processing circuit operatively connected to the interface circuit and configured to:
- send a first request message to a request router to request a content manifest associated with media content;
- receive, responsive to the request message, a response message including a root manifest that encapsulates a base uniform resource locator pointing to a delivery node in the content delivery network and a media link pointing to the requested content manifest;
- send a second request message for the content manifest to the delivery node using the base uniform resource locator;
- receive a second response message with a relative content manifest from the delivery node; and
- send one or more requests for the media content to the delivery node.

14. The media playback device of claim 13 wherein, to send one or more requests for the media content to the delivery node, the processing circuit is configured to:
- determine a relative uniform resource locator for media content based on the relative content manifest; and
- create a third request for the media content by concatenating the relative uniform resource locator for the media content with the base uniform resource locator of the delivery node.

15. The media playback device of claim 13 wherein the media content comprises bootstrap file for a media stream.

16. The media playback device of claim 13 wherein the media content comprises a media fragment of a media stream.

* * * * *